United States Patent [19]

Kitamura et al.

[11] Patent Number: 5,983,860
[45] Date of Patent: Nov. 16, 1999

[54] THROTTLE CONTROL DEVICE

[75] Inventors: Takamasa Kitamura, Nagoya; Masato Seki, Obu, both of Japan

[73] Assignee: Toyota Jidosha Kabushiki Kaisha, Toyota, Japan

[21] Appl. No.: 08/990,022

[22] Filed: Dec. 12, 1997

[30] Foreign Application Priority Data

Dec. 19, 1996 [JP] Japan .................................. 8-340173

[51] Int. Cl.⁶ .................................................. F02D 7/00
[52] U.S. Cl. ........................................ 123/399; 123/361
[58] Field of Search ..................... 123/399, 361

[56] References Cited

U.S. PATENT DOCUMENTS

| | | | |
|---|---|---|---|
| 5,255,653 | 10/1993 | Ironside et al. ........................ | 123/399 |
| 5,307,776 | 5/1994 | Unuvar et al. ........................ | 123/399 |
| 5,320,076 | 6/1994 | Reppich et al. . | |
| 5,327,865 | 7/1994 | Riehemann ........................ | 123/399 |
| 5,429,092 | 7/1995 | Kamei . | |
| 5,521,825 | 5/1996 | Unuvar et al. ........................ | 123/361 |
| 5,669,353 | 9/1997 | Shirai et al. ........................ | 123/399 |
| 5,823,164 | 10/1998 | Seki et al. ........................ | 123/361 |

FOREIGN PATENT DOCUMENTS

| | | |
|---|---|---|
| 41 33 571 A1 | 4/1993 | Germany . |
| 44 06 088 A1 | 9/1994 | Germany . |
| A-4-214940 | 8/1992 | Japan . |
| A-4-228853 | 8/1992 | Japan . |
| B-6-94820 | 11/1994 | Japan . |

*Primary Examiner*—John Kwon
*Attorney, Agent, or Firm*—Oliff & Berridge, PLC

[57] ABSTRACT

The throttle control device of this invention for controlling a throttle based on outputs of a position sensor including a first sensor and a second sensor which detect a position of a same object includes: a judgment section for judging whether or not the position sensor is abnormal by comparing a difference between the output of the first sensor and the output of the second sensor with a predetermined threshold value; and a change section for changing the predetermined threshold value depending on at least one of the output of the first sensor and the output of the second sensor.

9 Claims, 7 Drawing Sheets

THROTTLE CONTROL DEVICE

BACKGROUND OF THE INVENTION

1. Field of the Invention

The present invention relates to a throttle control device including a double-system sensor, and more particularly, relates to a throttle control device which controls a throttle in consideration of an abnormal state of the double-system sensor.

2. Description of the Related Art

Japanese Publication for Opposition No. 6-94820 discloses an electronic control device which detects an abnormality of a double-system accelerator position sensor including a main sensor and a sub-sensor. This electronic control device displays an error message on a display device when the difference between signals output from the main sensor and the sub-sensor exceeds a predetermined threshold value, thereby indicating that an abnormality has been detected in the accelerator position sensor.

However, the Publication has not considered the case where the variation degree of the output of the double-system sensor changes when the contact resistance between a resistor and a brush of the double-system sensor increases.

More specifically, the variation degree of the output of the double-system sensor changes depending on the detection position of the double-system sensor when the contact resistance increases. This has been found by the inventors of the present invention. Therefore, in the conventional method in which the double-system sensor is judged abnormal when the difference between the signals output from the double-system sensor exceeds a predetermined value, the precision of the abnormality detection is low.

In view of the foregoing, the objective of the present invention is to provide a throttle control device which can detect an abnormality of a double-system sensor with high precision irrespective of a change in the variation degree of the output of the double-system sensor.

SUMMARY OF THE INVENTION

The throttle control device of this invention for controlling a throttle based on outputs of a position sensor including a first sensor and a second sensor which detect a position of a same object includes: a judgment section for judging whether or not the position sensor is abnormal by comparing a difference between the output of the first sensor and the output of the second sensor with a predetermined threshold value; and a change section for changing the predetermined threshold value depending on at least one of the output of the first sensor and the output of the second sensor.

In one embodiment of the invention, the position sensor is an accelerator position sensor for detecting a position of an accelerator.

In another embodiment of the invention, the position sensor is a throttle position sensor for detecting an opening of a throttle valve.

In still another embodiment of the invention, the throttle control device further includes a determination section for determining a first reference value indicating a reference position of the first sensor and a second reference value indicating a reference position of the second sensor, wherein the judgment section judges whether or not the position sensor is abnormal by comparing the output of the first sensor which has been corrected based on the first reference value with the output of the second sensor which has been corrected based on the second reference value.

In still another embodiment of the invention, the first reference value and the second reference value are determined at an engine start, and the judgment section judges whether or not the position sensor is abnormal by comparing a difference between the first reference value and the second reference value with a predetermined value.

Alternatively, the throttle control device of this invention for controlling a throttle based on outputs of a position sensor including a first sensor and a second sensor which detect a position of a same object includes: a judgment section for judging whether or not the position sensor is abnormal based on whether or not a sum of the output of the first sensor and the output of the second sensor is out of a predetermined range; and a change section for changing the predetermined range depending on at least one of the output of the first sensor and the output of the second sensor.

In one embodiment of the invention, the position sensor is an accelerator position sensor for detecting a position of an accelerator.

In another embodiment of the invention, the position sensor is a throttle position sensor for detecting an opening of a throttle valve.

In still another embodiment of the invention, the throttle control device further includes a determination section for determining a reference value indicating a sum of a reference position of the first sensor and a reference position of the second sensor, wherein the judgment section judges whether or not the position sensor is abnormal by comparing the sum of the output of the first sensor and the output of the second sensor with the reference value.

In still another embodiment of the invention, the reference value is determined at an engine start, and the judgment section judges whether or not the position sensor is abnormal based on whether or not the reference value is within a predetermined range.

In still another embodiment of the invention, the position sensor is a throttle position sensor for detecting an opening of a throttle valve, and the throttle control device further includes: a selection section for selecting one of the first sensor and the second sensor which outputs a detection signal indicating that the opening of the throttle valve is larger if the throttle position sensor is judged abnormal; and a section for performing throttle control based on the output of the selected sensor.

In still another embodiment of the invention, the throttle control device further includes a section for discontinuing the throttle control based on the output of the selected sensor if the output of the selected sensor is continuously used thereby to increase the opening of the throttle valve for a predetermined time period.

In still another embodiment of the invention, the position sensor is an accelerator position sensor for detecting a position of an accelerator, and the throttle control device further includes: a selection section for selecting one of the first sensor and the second sensor which outputs a detection signal indicating that an opening of the accelerator is smaller if the throttle position sensor is judged abnormal; and a section for performing throttle control based on the output of the selected sensor.

In still another embodiment of the invention, the throttle control device further includes a section for discontinuing the throttle control based on the output of the selected sensor if the output of the selected sensor is continuously used thereby to decrease the opening of the accelerator for a predetermined time period.

Thus, according to the present invention, whether or not the position sensor is abnormal is judged by comparing the difference between the output of the first sensor and the output of the second sensor with a predetermined threshold value, and the predetermined threshold value is changed depending on at least one of the outputs of the first and second sensors. This prevents a wrong detection of an abnormality of the position sensor even if the variation degree of the output of the sensor depending on the sensor detection position changes due to a change in the contact resistance caused by generation of particles worn off by abrasion or the like. This improves the precision of the detection of an abnormality of the position sensor.

According to the present invention, the precision of the detection of an abnormality of the accelerator position sensor, as well as that of the throttle position sensor, can be improved.

According to the present invention, whether or not the position sensor is abnormal is judged by comparing the output of the first sensor which has been corrected based on the first reference value with the output of the second sensor which has been corrected based on the second reference value. This compensates for deviations in the initial positions of the first and second sensors. As a result, the precision of the detection of an abnormality of the position sensor improves.

According to the present invention, the first reference value and the second reference value are determined at the engine start, and whether or not the position sensor is abnormal is judged using the first and second reference values. This allows for the abnormality detection immediately after the engine start.

According to the present invention, whether or not the position sensor is abnormal is judged by judging whether or not the sum of the outputs of the first and second sensors is out of a predetermined range, and the predetermined range is changed depending on at least one of the outputs of the first and second sensors. This prevents a wrong detection of an abnormality of the position sensor even if the variation degree of the output of the sensor at the sensor detection position changes due to a change in the contact resistance caused by generation of particles worn off by abrasion or the like. This improves the precision of the detection of an abnormality of the position sensor.

According to the present invention, whether or not the position sensor is abnormal is judged by comparing the sum of the outputs of the first and second sensors with the reference value. This compensates deviations in initial positions of the first and second sensors. As a result, the precision of the detection of an abnormality of the position sensor improves.

According to the present invention, the reference value is determined at the engine start, and whether or not the position sensor is abnormal is judged based on whether or not the reference value is within a predetermined range. This allows for the abnormality detection immediately after the engine start.

According to the present invention, one of the first and second sensors which outputs a detection signal indicating that the opening of the throttle valve is larger is selected if the throttle position sensor is judged abnormal, and the throttle control is performed based on the output of the selected sensor. The throttle valve is thus controlled toward closing, thereby preventing an unintended increase in the engine output.

According to the present invention, the throttle control based on the output of the selected sensor is discontinued if the output of the selected sensor is continuously used thereby to increase the opening of the throttle valve for a predetermined time period. As a result, an engine stall can be prevented since the throttle valve is completely closed.

According to the present invention, one of the first and second sensors which outputs a detection signal indicating that the opening of the throttle valve is smaller is selected if the throttle position sensor is determined to be abnormal, and the throttle control is performed based on the output of the selected sensor. The throttle valve is thus controlled toward closing, thereby preventing an unintended increase in the engine output.

According to the present invention, the throttle control based on the output of the selected sensor is discontinued if the output of the selected sensor is continuously used thereby to decrease the opening of the accelerator for a predetermined time period. As a result, an engine stall can be prevented since the throttle valve is completely closed.

Thus, the invention described herein makes possible the advantage of providing a throttle control device which can detect an abnormality of a double-system sensor with high precision irrespective of a change in the variation degree of the output of the double-system sensor.

These and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention will be described by way of examples with reference to the accompanying drawings.

EXAMPLE 1

Figure 1:
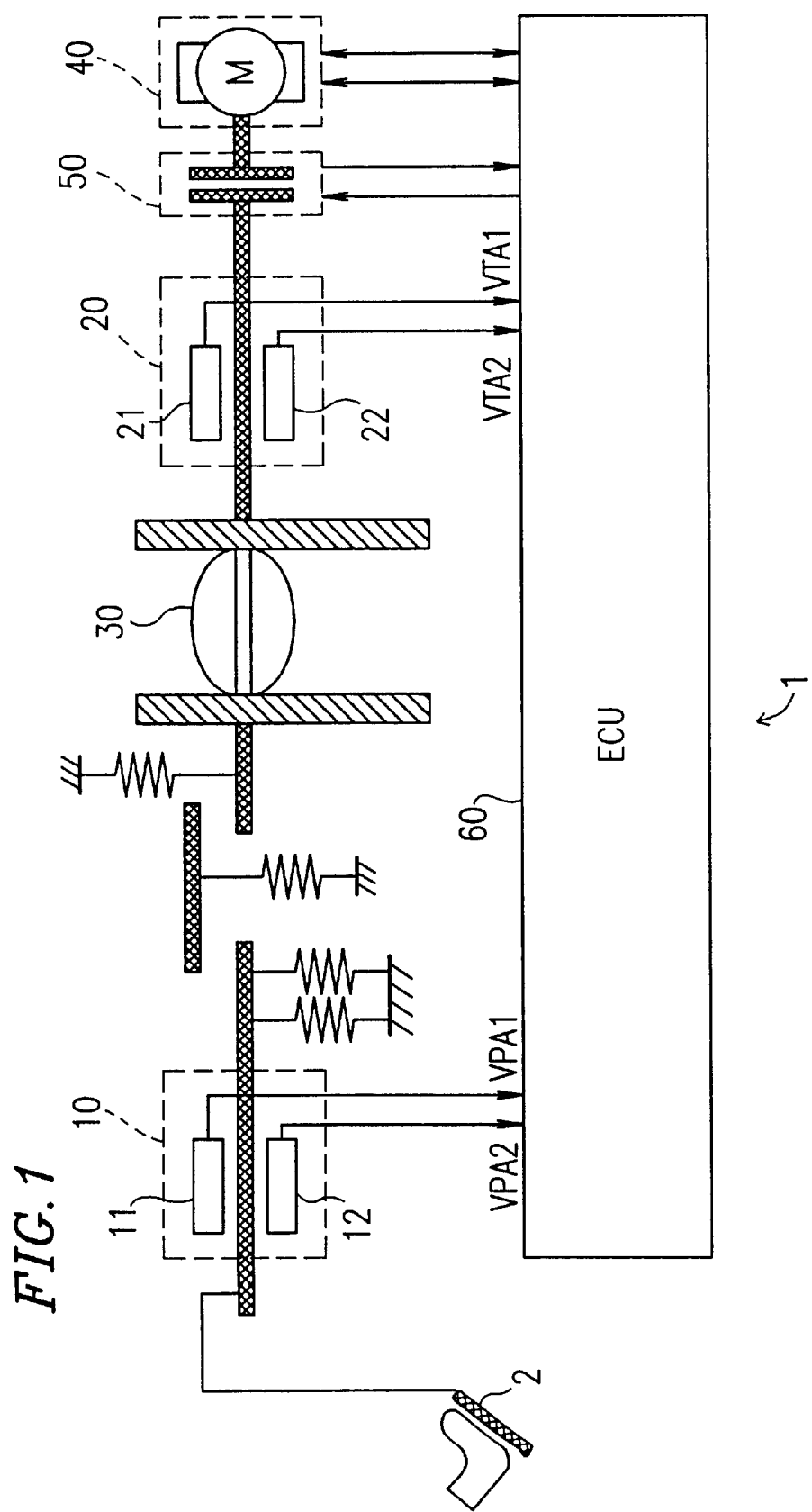
FIG. 1 is a structural view of a throttle control device according to the present invention.

FIG. 1 shows a throttle control device 1 of this example according to the present invention. The throttle control device 1 includes a double-system accelerator position sensor 10, a double-system throttle position sensor 20, a motor 40 for driving a throttle valve 30, an electromagnetic clutch 50 for controlling the connection/disconnection between the throttle valve 30 and the motor 40, and an electronic control unit (ECU) 60.

The accelerator position sensor 10 includes a main sensor 11 and a sub-sensor 12. The main sensor 11 detects the position of an accelerator based on the amount by which an accelerator pedal 2 is pressed, and outputs a detection signal VPA1 indicating the accelerator position to the ECU 60. The sub-sensor 12 also detects the accelerator position based on the amount by which the accelerator pedal 2 is pressed, and outputs a detection signal VPA2 indicating the accelerator position to the ECU 60.

The throttle position sensor 20 includes a main sensor 21 and a sub-sensor 22. The main sensor 21 detects the actual position of the throttle valve 30, and outputs a detection signal VTA1 indicating the actual position of the throttle valve 30 to the ECU 60. The sub-sensor 22 also detects the actual position of the throttle valve 30, and outputs a detection signal VTA2 indicating the actual position of the throttle valve 30 to the ECU 60.

The ECU 60 calculates a target opening of the throttle valve 30 based on the detection signals VPA1 and VPA2 output from the accelerator position sensor 10. The ECU 60 also controls the rotation of the motor 40 based on the detection signals VTA1 and VTA2 output from the throttle position sensor 20 so that the actual opening of the throttle valve 30 is closer to the target opening.

The ECU 60 controls the electromagnetic clutch 50 so that the throttle valve 30 and the motor 40 are electromagnetically connected to each other during the normal driving of a vehicle.

Figure 2:
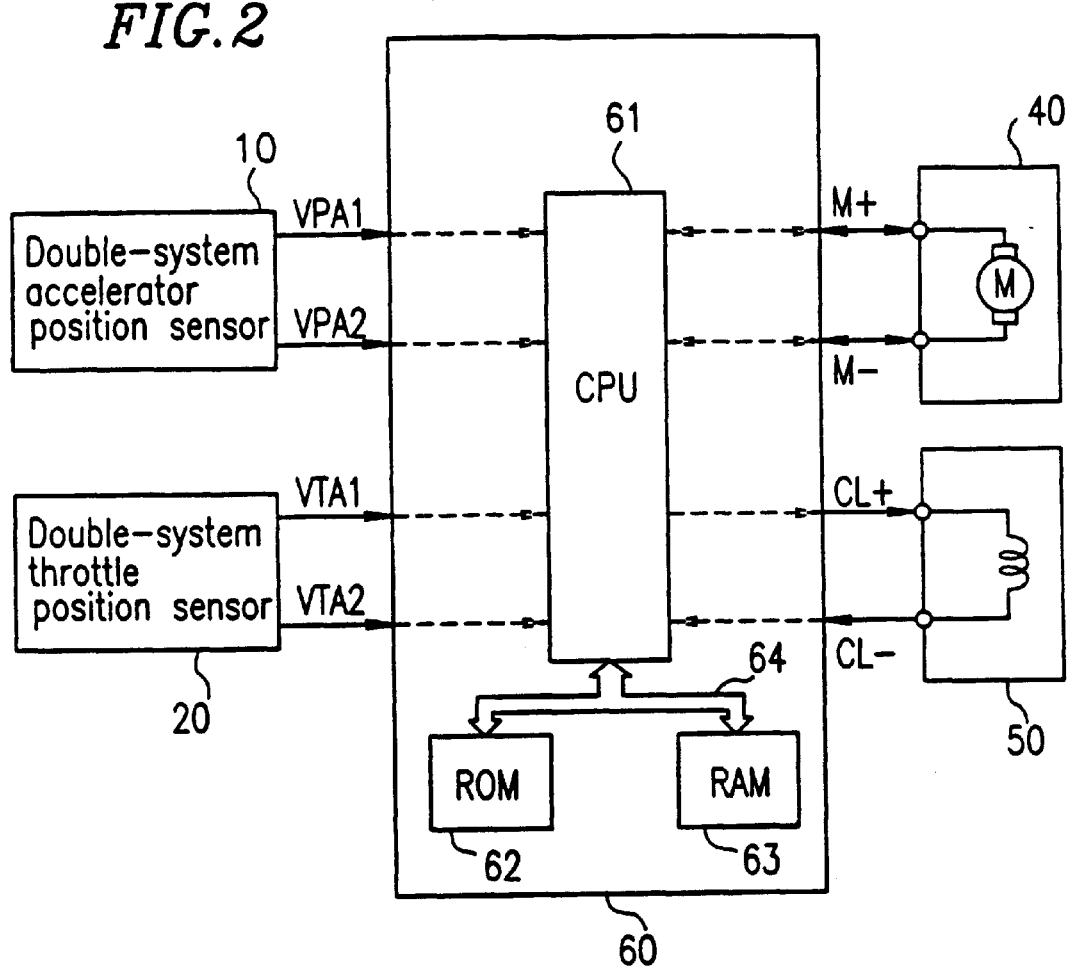
FIG. 2 is a structural view of an ECU of the throttle control device of FIG. 1.

FIG. 2 shows the configuration of the ECU 60, which includes a central processing unit (CPU) 61, a read-only memory (ROM) 62, and a random access memory (RAM) 63. The CPU 61, the ROM 62, and the RAM 63 are connected with one another via a bus 64.

The ROM 62 stores a program for an abnormality detection process for the throttle position sensor 20. The CPU 61 reads the program stored in the ROM 62 and executes the abnormality detection process.

Figure 3:
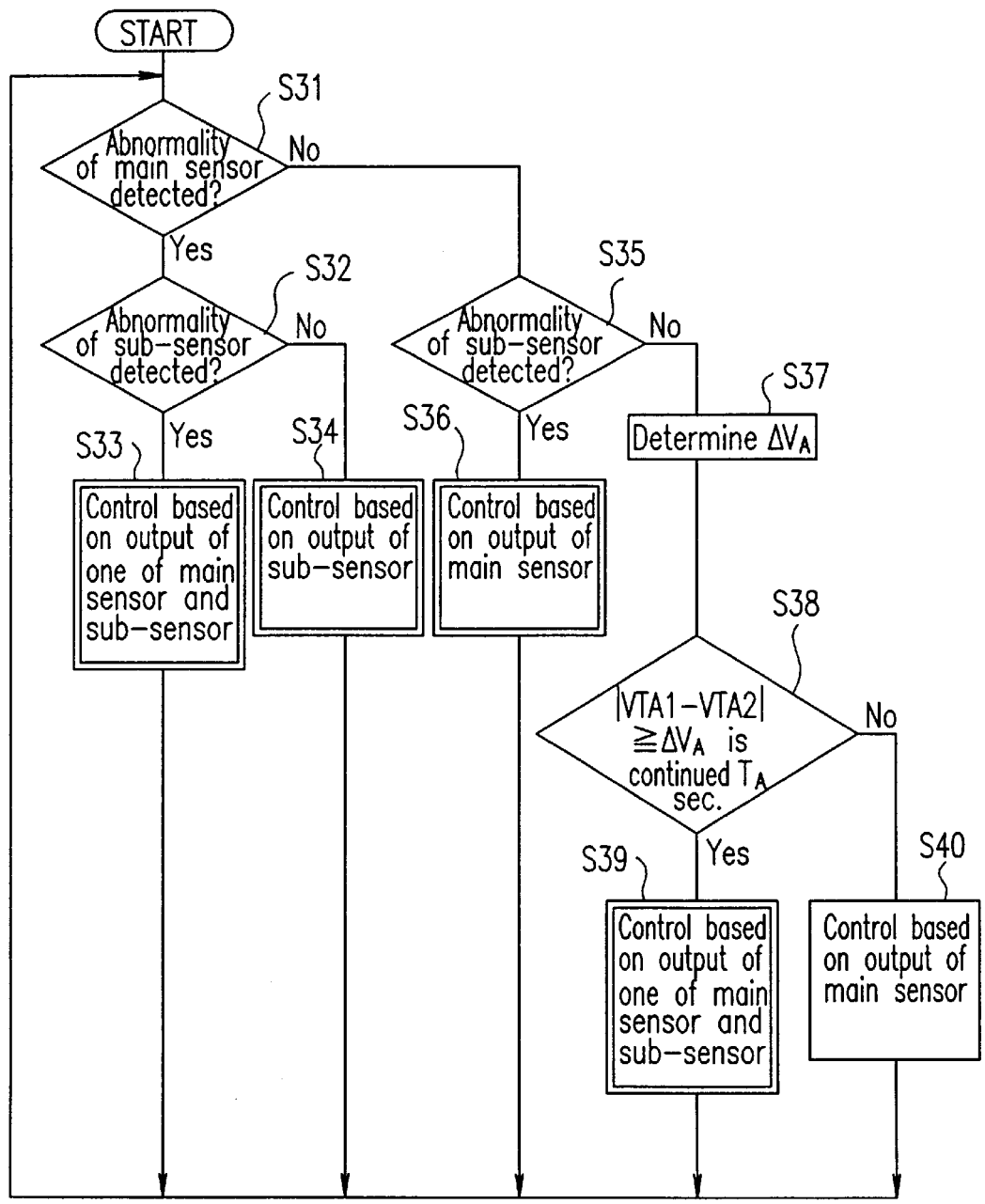
FIG. 3 is a flowchart showing an abnormality detection process for a throttle position sensor of the throttle control device of FIG. 1.

FIG. 3 shows the procedure of the abnormality detection process for the throttle position sensor 20 in the case where the main sensor 21 and the sub-sensor 22 of the throttle position sensor 20 have characteristics with the same polarity. This abnormality detection process is executed by the CPU 61 during the throttle control operation.

The case where the main sensor 21 and the sub-sensor 22 of the throttle position sensor 20 have "characteristics with the same polarity" as used herein is defined as both cases where the two sensors have "positive characteristics" and where they have "negative characteristics". The sensor having "positive characteristics" as used herein is defined as a type of sensor for which the output voltage is larger as the opening of an object to be detected is larger. In contrast, the sensor having "negative characteristics" as used herein is defined as a type of sensor for which the output voltage is smaller as the opening of an object to be detected is larger.

Hereinbelow, the abnormality detection process for the throttle position sensor 20 will be described step by step with reference to FIG. 3.

At step S31, the CPU 61 judges whether or not the main sensor 21 is abnormal. For example, the CPU 61 judges that the main sensor 21 is abnormal if the condition, "VTA1≦$T_{min1}$" or "VTA1≧$T_{max1}$" wherein VTA1 denotes the output of the main sensor 21, $T_{min1}$ denotes a predetermined lower limit, and $T_{max1}$ denotes a predetermined upper limit, is satisfied.

At steps S32 and S35, the CPU 61 judges whether or not the sub-sensor 22 is abnormal. For example, the CPU 61 judges that the sub-sensor 22 is abnormal if the condition, "VTA2≦$T_{min2}$" or "VTA2≧$T_{max2}$" wherein VTA2 denotes the output of the sub-sensor 22, $T_{min2}$ denotes a predetermined lower limit, and $T_{max2}$ denotes a predetermined upper limit, is satisfied.

If the judgment results at steps S31 and S35 indicate that both the main sensor 21 and the sub-sensor 22 are not abnormal, the process proceeds to step S37.

At step S37, the CPU 61 determines a threshold value $\Delta V_A$ based on at least one of the output VTA1 of the main sensor 21 and the output VTA2 of the sub-sensor 22. The detail of the determination of the threshold value $\Delta V_A$ will be described later.

At step S38, the CPU 61 judges whether or not the difference between the output VTA1 of the main sensor 21 and the output VTA2 of the sub-sensor 22 continues to be equal to or more than the threshold value $\Delta V_A$ for a predetermined time $T_A$ (e.g., for $T_A$ seconds). In other words, it is judged whether or not formula (1) below is continuously satisfied for the predetermined time $T_A$.

$$|VTA1-VTA2| \geq \Delta V_A \tag{1}$$

If the judgment result at step S38 is "Yes", the process proceeds to step S39.

At step S39, the CPU 61 performs the throttle control based on the output of one of the main sensor 21 and the sub-sensor 22 with which the opening of the throttle valve 30 is controlled to be smaller.

The CPU 61 performs the throttle control so that the opening of the throttle valve 30 is smaller as the output of the main sensor 21 or the sub-sensor 22 is larger. Accordingly, at step S39, the CPU 61 selects one of the main sensor 21 and the sub-sensor 22 for which the output is larger, and performs the throttle control based on the output of the selected sensor.

If the judgment result at step S38 is "No", the process proceeds to step S40.

At step S40, the CPU 61 performs the throttle control based on the output of the main sensor 21.

If the judgment results at steps S31 and S35 indicate that the main sensor 21 is normal while the sub-sensor 22 is abnormal, the process proceeds to step S36.

At step S36, the CPU 61 performs the throttle control based on the output of the main sensor 21.

If the judgment results at steps S31 and S32 indicate that the main sensor 21 is abnormal while the sub-sensor 22 is normal, the process proceeds to step S34.

At step S34, the CPU 61 performs the throttle control based on the output of the sub-sensor 22.

If the judgment results at steps S31 and S32 indicate that both the main sensor 21 and the sub-sensor 22 are abnormal, the process proceeds to step S33.

Figure 4:
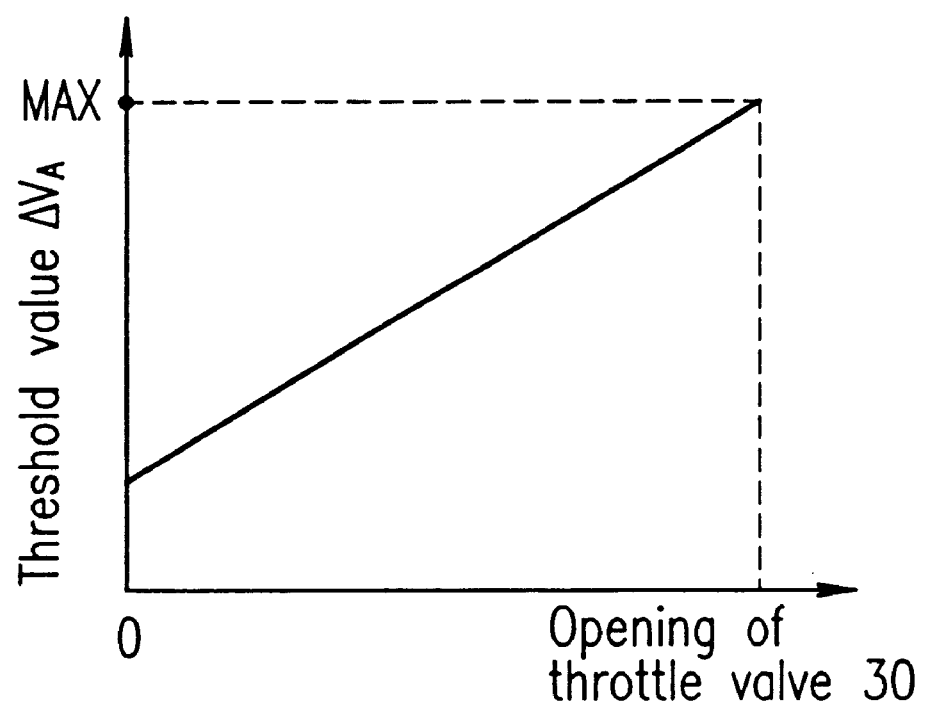
FIG. 4 is a graph showing the relationship between the opening of a throttle valve and the threshold value.

At step S33, the CPU 61 performs the throttle control based on the output of one of the main sensor 21 and the sub-sensor 22 with which the opening of the throttle valve 30 is controlled to be smaller. This processing at step S33 is the same as that at step S39 described above, FIG. 4 illustrates the relationship between the opening of the throttle valve 30 and the threshold value $\Delta V_A$. As is observed from FIG. 4, the threshold value $\Delta V_A$ is determined to be larger as the opening of the throttle valve 30 is larger. The relationship shown in FIG. 4 is stored in advance in the ROM 62 in the form of a map, for example. The CPU 61 can thus obtain the threshold value $\Delta V_A$ corresponding to the opening of the throttle valve 30.

The opening of the throttle valve 30 as the parameter for determining the threshold value $\Delta V_A$ is determined based on one of the outputs of the main sensor 21 and the sub-sensor 22 which is larger. For example, when the output of the main sensor 21 indicates that "the opening of the throttle valve 30 is 58°" while the output of the sub-sensor 22 indicates that "the opening of the throttle valve 30 is 60°", the threshold value $\Delta V_A$ is determined based on the opening 60° of the throttle valve 30. This is because it is not possible to judge which is abnormal, the main sensor 21 or the sub-sensor 22.

The relationship between the opening of the throttle valve 30 and the threshold value $\Delta V_A$ may be stored in advance in the ROM 62 in the form of a table instead of the graph shown in FIG. 4.

Table 1 below is an example of the table representing the relationship between the opening of the throttle valve 30 and the threshold value $\Delta V_A$.

TABLE 1

| tVTA | Threshold value $\Delta V_A$ |
|---|---|
| tVTA < tV$_{A1}$ | V$_{A1}$ |
| tV$_{A1}$ ≦ tVTA < tV$_{A2}$ | V$_{A2}$ |
| tV$_{A2}$ ≦ tVTA < tV$_{A3}$ | V$_{A3}$ |
| tV$_{A3}$ ≦ tVTA < tV$_{A4}$ | V$_{A4}$ |
| tV$_{A4}$ ≦ tVTA | V$_{A5}$ | tVTA = MAX(VTA1,VTA2)

In Table 1, tVTA denotes one of the output VTA1 of the main sensor 21 and the output VTA2 of the sub-sensor 22 which is larger, represented by MAX(VTA1,VTA2). V$_{A1}$ to V$_{A5}$ denote predetermined voltages which satisfy the relationship of V$_{A1}$<V$_{A2}$<V$_{A3}$<V$_{A4}$<V$_{A5}$. tV$_{A1}$ to tV$_{A4}$ denote predetermined voltages which satisfy the relationship of tV$_{A1}$<tV$_{A2}$<tV$_{A3}$<tV$_{A4}$.

Thus, by controlling the threshold value $\Delta V_A$ based on the opening of the throttle valve 30, the precision of the detection of an abnormality of the throttle position sensor 20 is improved. The reasons are as follows.

Each of the main sensor 21 and the sub-sensor 22 has a structure of a resistor and a brush sliding along the resistor. The sliding of the brush on the resistor generates particles worn off by abrasion, which causes an increase in the contact resistance between the resistor and the brush. When the contact resistance increases, the variation degree at which the output of the main sensor 21 (or the sub-sensor 22) varies depending on the opening of the throttle valve 30 changes. The threshold value $\Delta V_A$ is determined so as to compensate such a change in the variation degree of the output, thereby to prevent a wrong detection of an abnormality of the throttle position sensor 20. This improves the precision of the detection of an abnormality of the throttle position sensor 20.

Referring again to FIG. 3, the processings at steps S33, S34, S36, and S39 are called "fail-safe processings", which are executed after at least one of the main sensor 21 and the sub-sensor 22 is judged abnormal. In FIG. 3, the steps for the fail-safe processing are marked by double-line squares. The fail-safe processing is an emergency processing which is executed until the abnormality of the throttle position sensor 20 is confirmed. Accordingly, in the case where the fail-safe processing is continuously executed for a predetermined time period, the CPU 61 should preferably confirm that the throttle position sensor 20 is abnormal and discontinue the throttle control.

The throttle control may be discontinued by various methods. For example, the CPU 61 discontinues the throttle control by turning off both the motor 40 and the electromagnetic clutch 50.

In this way, the electronic throttle control is discontinued in the case where the abnormality of the throttle position sensor 20 is confirmed. As a precaution, therefore, it is preferable to provide a mechanism for controlling the throttle valve 30 in place of the electronic throttle control when such a case occurs, to ensure that the vehicle can be at least driven to a side-track. This emergency driving to a sidetrack is possible by mechanically linking the accelerator pedal 2 and the throttle valve 30 after the motor 40 and the electromagnetic clutch 50 are turned off.

In the fail-safe processing at steps S33 and S39, if the output of the selected sensor, i.e., the main sensor 21 or the sub-sensor 22, is continuously used thereby to increase the opening of the throttle valve for a predetermined time period, the throttle control based on the output of the selected sensor should preferably be discontinued, to prevent an engine stall from occurring. Alternatively, instead of discontinuing the throttle control, the throttle control may be continued by switching to the output of the non-selected sensor.

To further improve the precision of the detection of an abnormality of the throttle position sensor 20, reference positions (points 0) of the main sensor 21 and the sub-sensor 22 may be determined before the start of the throttle control, so as to compensate a deviation in an initial position of each of the main sensor 21 and the sub-sensor 22.

In this improved abnormality detection for the throttle position sensor 20, formula (1) at step S38 is replaced with formula (2) below.

$$|(VTA1-GV_1)-(VTA2-GV_2)| \geq \Delta V_A \qquad (2)$$

wherein $GV_1$ denotes the reference position of the main sensor 21 and $GV_2$ denotes the reference position of sub-sensor 22.

The reference position $GV_1$ of the main sensor 21 and the reference position $GV_2$ of the sub-sensor 22 are obtained in an initial determination process.

Figure 5:
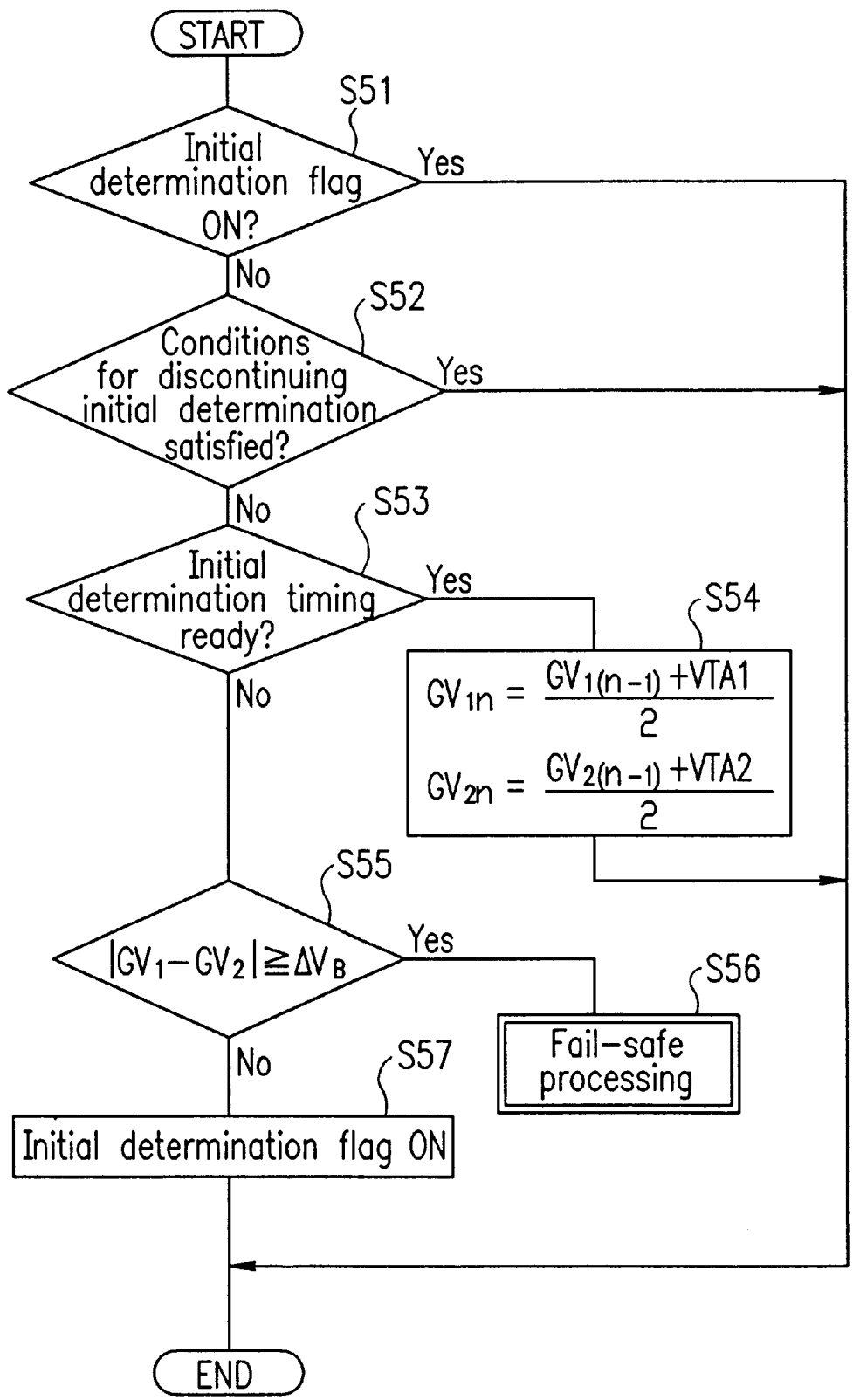
FIG. 5 is a flowchart showing an initial determination process according to the present invention.

The initial determination process will be described with reference to FIG. 5. The initial determination process is executed by the CPU 61 after an ignition switch is turned on and before actuators (such as the motor and the electromagnetic valve) which drive the throttle valve 30 are supplied with energy.

At step S51, the CPU 61 judges whether or not an initial determination flag is on. The initial determination flag is used to indicate whether or not the initial determination process has been completed. Initially, the initial determination flag has been set at an OFF state and is changed to an ON state at the completion of the initial determination process.

At step S52, the CPU 61 judges whether or not the conditions for discontinuing the initial determination process have been satisfied. This is judged to prevent the initial determination process from being executed under conditions inappropriate for the determination of the reference position of the main sensor 21 (or the sub-sensor 22). For example, when the CPU 61 detects a trouble such as a lowering of the output voltage of the sensor, a disconnection or a short circuit of the sensor, and a mechanical opening of the throttle valve 30, it judges that the conditions for discontinuing the initial determination process have been satisfied and thus skips the initial determination process.

At step S53, the CPU 61 judges whether or not the timing for the initial determination is ready. The CPU 61 judges that the timing for the initial determination is ready during the period after the ignition switch is turned on and before the actuators (such as the motor and the electromagnetic valve) which drive the throttle valve 30 are supplied with energy.

At step S54, the CPU 61 calculates the average of the output VTA1 of the main sensor 21 and the average of the output VTA2 of the sub-sensor 22 using, for example, recurrence formula (3) below:

$$GV_{1n}=(GV_{1(n-1)}+VTA1)/2$$
$$GV_{2n}=(GV_{2(n-1)}+VTA2)/2 \quad (3)$$

In this way, if it is judged that the timing for the initial determination is ready at step S53, the average of the output VTA1 of the main sensor 21 and the average of the output VTA2 of the sub-sensor 22 are renewed at step S54. The CPU 61 then stores the latest averages $GV_{1n}$ and $GV_{2n}$ in the RAM 63 as a reference position $GV_1$ of the main sensor 21 and a reference position $GV_2$ of the sub-sensor 22, respectively.

At step S55, the CPU 61 judges whether or not the difference between the reference position $GV_1$ of the main sensor 21 and the reference position $GV_2$ of the sub-sensor 22 continues to be equal to or more than a threshold value $\Delta V_B$ for a predetermined time $T_B$ (e.g., for $T_B$ seconds). In other words, it is judged at step S55 whether or not the relationship represented by formula (4) below is continuously satisfied for the predetermined time $T_B$.

$$|GV_1 - GV_2| \geq \Delta V_B \quad (4)$$

If the judgment result at step S55 is "Yes", the process proceeds to step S56.

At step S56, the CPU 61 executes the fail-safe processing which is the same as that at step S33 (or step S39) in FIG. 3.

If the judgment result at step S55 is "No", the process proceeds to step S57. At step S57, the initial determination flag is switched ON.

As described above, the reference position $GV_1$ of the main sensor 21 and the reference position $GV_2$ of the sub-sensor 22 are determined at the engine start, and whether or not the throttle position sensor 20 is abnormal is judged based on the reference positions $GV_1$ and $GV_2$. This makes it possible to detect an abnormality of the throttle position sensor 20 immediately after the engine start.

Alternatively, recurrence formula (5) below may be used, in place of formula (3), at step S54 to calculate an average $TAS_n$ of the difference between the output VTA1 of the main sensor 21 and the output VTA2 of the sub-sensor 22, and whether or not the relationship represented by formula (6) below, instead of formula (4), is satisfied may be judged at step S55. In this case, the CPU 61 stores the latest value $TAS_n$ in the RAM 63 as an average TAS.

$$TAS_n=(TAS_{n-1}+(GV_{2n}-GV_{1n}))/2 \quad (5)$$
$$\Delta V_{B1} \leq TAS \leq \Delta V_{B2} \quad (6)$$

wherein $\Delta V_{B1}$ denotes a predetermined lower limit and $\Delta V_{B2}$ denotes a predetermined upper limit.

The threshold value $\Delta V_A$ at step S37 of the abnormality detection process for the throttle position sensor 20 may be determined depending on the state of the initial determination flag. For example, if the initial determination flag is in the OFF state, the threshold value $\Delta V_A$ may be set at the maximum (MAX) irrespective of the opening of the throttle valve 30. This is preferable because the variation degree of the output of each of the main sensor 21 and the sub-sensor 22 tends to become large due to a deviation in the initial position of the sensor.

EXAMPLE 2

Figure 6:
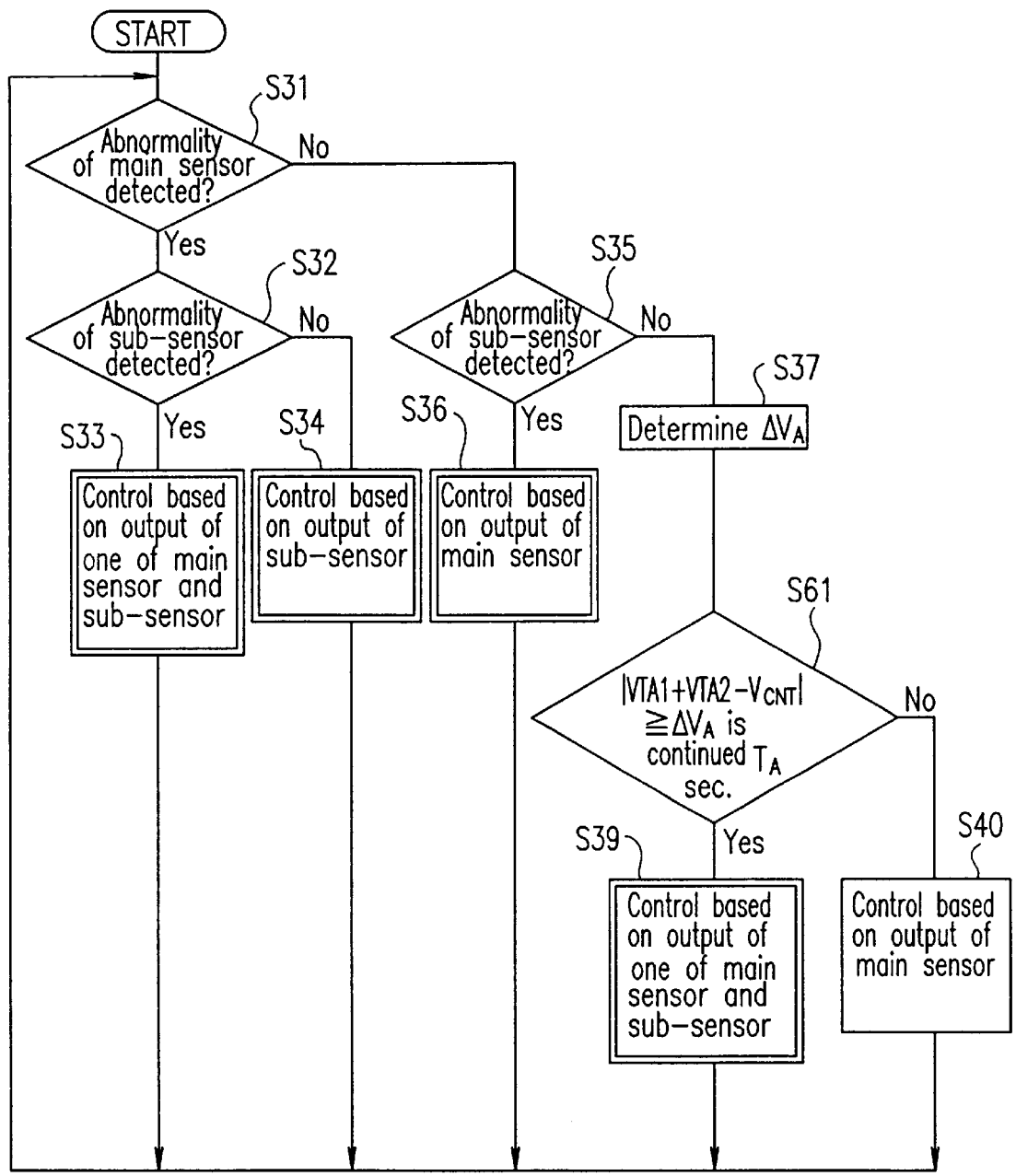
FIG. 6 is a flowchart showing another example of the abnormality detection process for the throttle position sensor according to the present invention.

FIG. 6 shows the procedure of the abnormality detection process for the throttle position sensor 20 in the case where the main sensor 21 and the sub-sensor 22 have characteristics with the opposite polarities. That is, one of the main sensor 21 and the sub-sensor 22 has positive characteristics, while the other has negative characteristics. The characteristics of the main sensor 21 and the sub-sensor 22 are pre-adjusted so that the sum of the output VTA1 of the main sensor 21 and the output VTA2 of the sub-sensor 22 is fixed at a predetermined value $V_{CNT}$ when both the main sensor 21 and the sub-sensor 22 are normal. The abnormality detection process for the throttle position sensor 20 is executed by the CPU 61 during the throttle control.

Referring to FIG. 6, the abnormality detection process for the throttle position sensor 20 of this example will be described. The procedure shown in FIG. 6 is the same as that in FIG. 3, except that step S61 replaces step S38 in FIG. 3, and thus the description on the same steps is omitted here.

At step 61, the CPU 61 judges whether or not the sum of the output VTA1 of the main sensor 21 and the output VTA2 of the sub-sensor 22 continues to be out of a predetermined range for a predetermined time $T_A$ (e.g., for $T_A$ seconds). In other words, it is judged at step S61 whether or not the relationship represented by formula (7) below is continuously satisfied for the predetermined time $T_A$.

$$|(VTA1+VTA2)-V_{CNT}| \geq \Delta V_A \quad (7)$$

If the judgment result at step S61 is "Yes", the process proceeds to step S39. If it is "No", the process proceeds to step S40.

To improve the precision of the detection of an abnormality of the throttle position sensor 20, the sum of the output VTA1 of the main sensor 21 and the output VTA2 of the sub-sensor 22 when both the main sensor 21 and the sub-sensor 22 are in the initial positions may be determined in advance, so as to compensate deviations in the initial positions.

In this improved abnormality detection process for the throttle position sensor 20, formula (8) below replaces formula (7) at step S61.

$$|(VTA1+VTA2)-PLUS| \geq \Delta V_A \quad (8)$$

wherein PLUS denotes the sum of the output VTA1 of the main sensor 21 and the output VTA2 of the sub-sensor 22 when both the main sensor 21 and the sub-sensor 22 are in the initial positions. The value PLUS is used as the reference value of the sum of the outputs VTA1 and VTA2. The value PLUS is obtained by an initial determination process.

Figure 7:
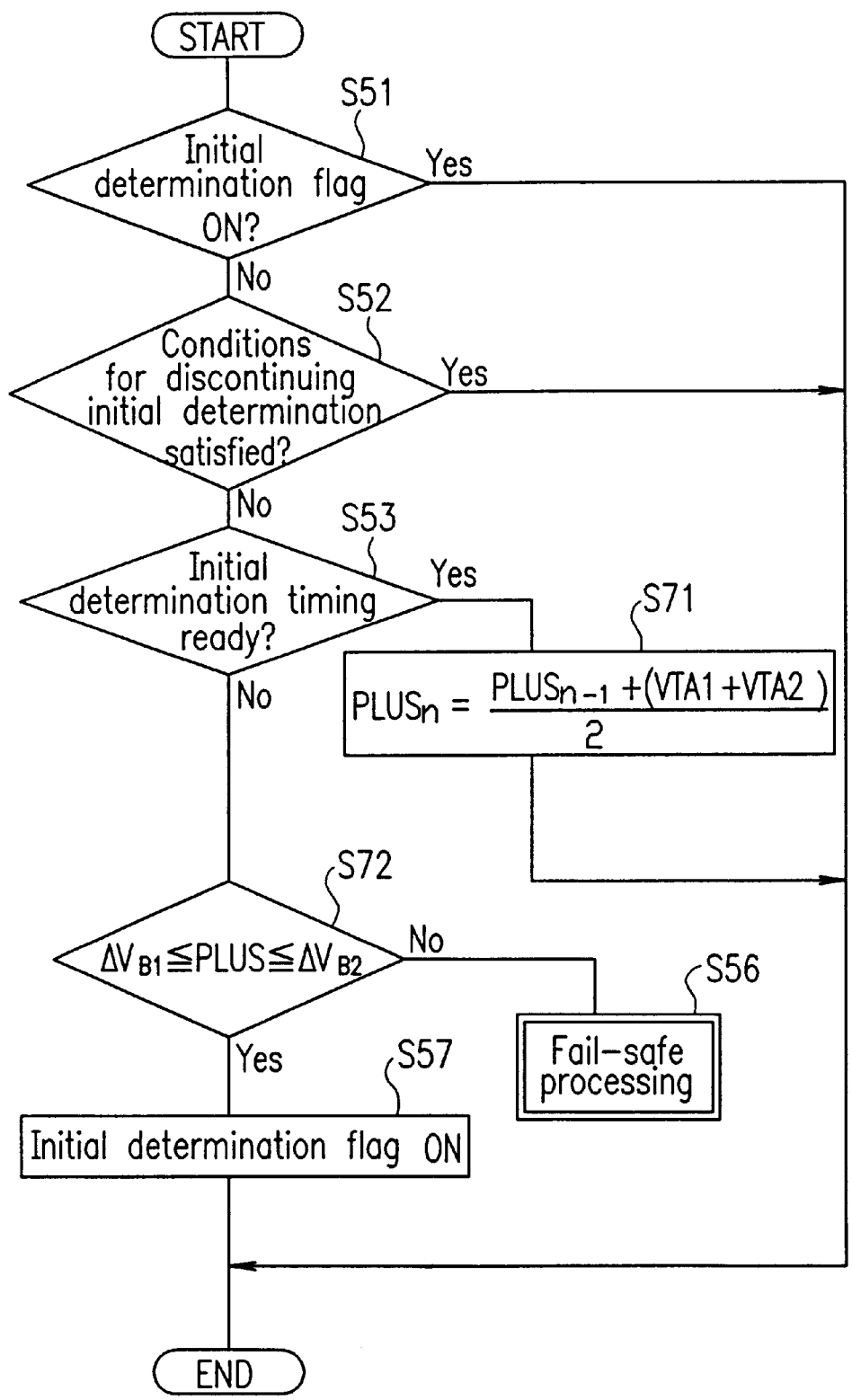
FIG. 7 is a flowchart showing another example of the initial determination process according to the present invention.

The initial determination process will be described with reference to FIG. 7. The initial determination process in this example shown in FIG. 7 is the same as that shown in FIG. 5, except that steps S71 and S72 replace steps S54 and S55 in FIG. 5, and thus the description on the same steps is omitted here.

At step S71, the CPU 61 calculates the average of the sum of the output VTA1 of the main sensor 21 and the output VTA2 of the sub-sensor 22 according to recurrence formula (9) below, for example:

$$PLUS_n=(PLUS_{n-1}+(VTA1+VTA2))/2 \quad (9)$$

In this way, if it is judged at step S53 that the timing for the initial determination is ready, the average of the sum of the output VTA1 of the main sensor 21 and the average of the output VTA2 of the sub-sensor 22 is renewed at step S71. The CPU 61 then stores the latest value $PLUS_n$ in the RAM 63 as the average PLUS.

At step S72, the CPU 61 judges whether or not the average PLUS continues to be within a predetermined range for a predetermined time $T_B$ (e.g., for $T_B$ seconds). In other words, it is judged at step S72 whether or not the relationship represented by formula (10) below is continuously satisfied for the predetermined time $T_B$.

$$\Delta V_{B1} \leq PLUS \leq \Delta V_{B2} \qquad (10)$$

wherein $\Delta V_{B1}$ denotes a predetermined lower limit and $\Delta V_{B2}$ denotes a predetermined upper limit.

If the judgment result at step S72 is "Yes", the process proceeds to step S57. If it is "No", the process proceeds to step S56.

As described above, the sum PLUS between the reference position of the main sensor 21 and the reference position of the sub-sensor 22 is determined at the engine start, and whether or not the throttle position sensor 20 is abnormal is judged based on the sum PLUS. This makes it possible to detect an abnormality of the throttle position sensor 20 immediately after the engine start.

According to the present invention, the CPU 61 can also execute the abnormality detection process for the accelera or position sensor 10 in a manner similar to that described above for the throttle position sensor 20. In the case of the accelerator position sensor 10, the throttle control is performed so that the opening of the throttle valve 30 is larger as the output of the main sensor 11 or the sub-sensor 12 of the accelerator position sensor 10 is larger. Accordingly, one of the main sensor 11 and the sub-sensor 12 for which the output is smaller is selected. In the case of the abnormality detection process for the accelerator position sensor 10, therefore, the CPU 61 selects one of the main sensor 11 and the sub-sensor 12 for which the output is smaller at step S33 or S39 in the flowchart of FIG. 3 (or FIG. 6), to continue the throttle control based on the output of the selected sensor.

In the case where the accelerator position sensor is judged abnormal, if the output of the selected sensor, i.e., the main sensor 21 or the sub-sensor 22, is continuously used thereby to decrease the opening of the accelerator for a predetermined time period, the throttle control based on the output of the selected sensor should preferably be discontinued, to prevent an engine stall from occurring. Alternatively, instead of discontinuing the throttle control, the throttle control may be continued by switching to the output of the non-selected sensor.

Thus, in the throttle control device according to the present invention, whether or not the position sensor is abnormal is judged by comparing the difference between the outputs of the first and second sensors with a predetermined threshold value. The predetermined threshold value is changed depending on at least one of the outputs of the first and second sensors. This prevents a wrong detection of an abnormality of the position sensor even if the variation degree of the output of the sensor depending on the sensor detection position changes due to a change in the contact resistance caused by generation of particles worn off by abrasion or the like. This improves the precision of the detection of an abnormality of the position sensor.

Also, according to the present invention, whether or not the position sensor is abnormal is judged based on whether or not the sum of the outputs of the first and second sensors is out of a predetermined range. The predetermined range is changed depending on at least one of the outputs of the first and second sensors. This prevents a wrong detection of an abnormality of the position sensor even if the variation degree of the output of the sensor depending on the sensor detection position changes due to a change in the contact resistance caused by generation of particles worn off by abrasion the like. This improves the precision of the detection of an abnormality of the position sensor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A throttle control device for controlling a throttle based on outputs of a position sensor including a first sensor and a second sensor which detect a position of a same object, the device comprising:

a judgment section for judging whether or not the position sensor is abnormal by comparing a difference between the output of the first sensor and the output of the second sensor with a predetermined threshold value; and a change section for changing the predetermined threshold value depending on at least one of the output of the first sensor and the output of the second sensor.

2. A throttle control device according to claim 1, wherein the position sensor is an accelerator position sensor for detecting a position of an accelerator.

3. A throttle control device according to claim 1, wherein the position sensor is a throttle position sensor for detecting an opening of a throttle valve.

4. A throttle control device according to claim 1, further comprising a determination section for determining a first reference value indicating a reference position of the first sensor and a second reference value indicating a reference position of the second sensor, wherein the judgment section judges whether or not the position sensor is abnormal by comparing the output of the first sensor which has been corrected based on the first reference value with the output of the second sensor which has been corrected based on the second reference value.

5. A throttle control device according to claim 4, wherein the first reference value and the second reference value are determined at an engine start, and the judgment section judges whether or not the position sensor is abnormal by comparing a difference between the first reference value and the second reference value with a predetermined value.

6. A throttle control device according to claim 1, wherein the position sensor is a throttle position sensor for detecting an opening of a throttle valve, and the throttle control device further comprises:
a selection section for selecting one of the first sensor and the second sensor which outputs a detection signal indicating that the opening of the throttle valve is larger if the throttle position sensor is judged abnormal; and
a section for performing throttle control based on the output of the selected sensor.

7. A throttle control device according to claim 6, further comprising a section for discontinuing the throttle control based on the output of the selected sensor if the output of the selected sensor is continuously used thereby to increase the opening of the throttle valve for a predetermined time period.

8. A throttle control device according to claim 1, wherein the position sensor is an accelerator position sensor for detecting a position of an accelerator, and the throttle control device further comprises:
- a selection section for selecting one of the first sensor and the second sensor which outputs a detection signal indicating that an opening of the accelerator is smaller if the throttle position sensor is judged abnormal; and
- a section for performing throttle control based on the output of the selected sensor.

9. A throttle control device according to claim 8, further comprising a section for discontinuing the throttle control based on the output of the selected sensor if the output of the selected sensor is continuously used thereby to decrease the opening of the accelerator for a predetermined time period.

* * * * *